Patented June 6, 1950

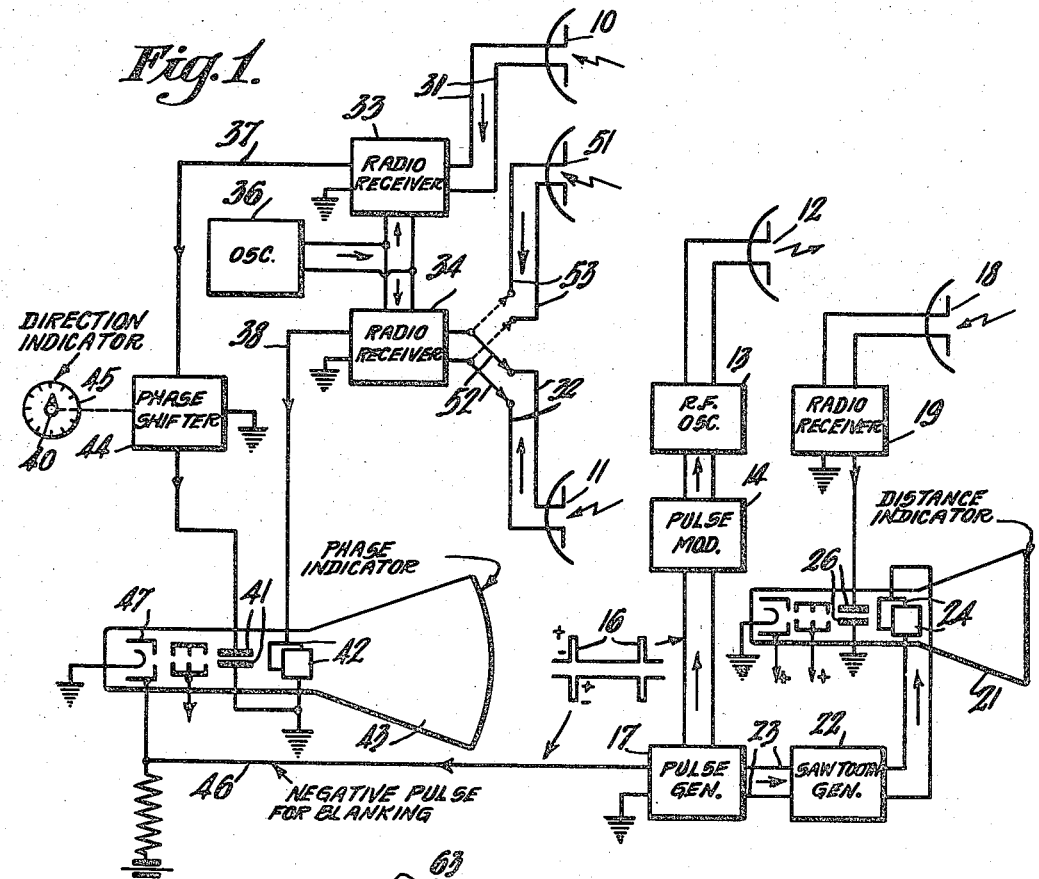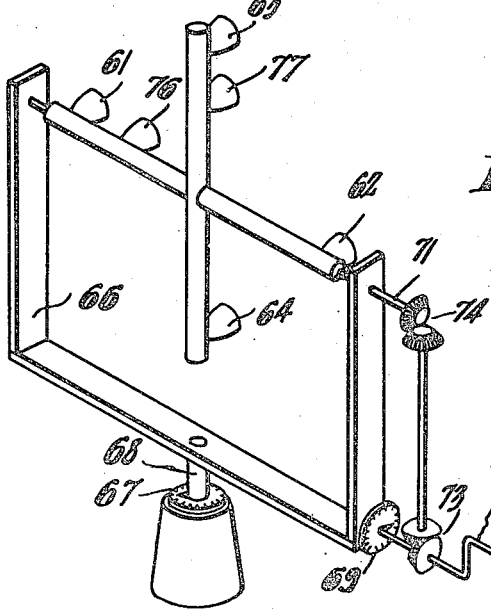

2,510,692

UNITED STATES PATENT OFFICE 2,510,692

DIRECTION FINDING SYSTEM

De Witt R. Goddard, Riverhead, N. Y., assignor to Radio Corporation of America, a corporation of Delaware Application June 25, 1945, Serial No. 601,391

2 Claims. (Cl. 343—16)

My invention relates to radio direction finders or locators and particularly to systems wherein radio pulses are transmitted and received after reflection.

An object of the invention is to provide an improved system for locating aircraft, ships or other objects that reflect radio waves.

A further object of the invention is to provide an improved radio direction finder.

A further object of the invention is to provide an improved radar system of the pulse-echo type for locating reflecting objects such as aircraft and ships.

In practicing one embodiment of the invention, radio pulses are radiated toward the object to be located and the pulses reflected therefrom are picked up by spaced antennas fixed in position. The pulses are supplied from the two antennas to a phase comparison circuit. The carrier wave of the pulse arriving at one antenna is out of phase with the carrier wave of the pulse arriving at the other antenna by an amount depending upon the difference in the distances from the two antennas to the reflecting object. Therefore, the direction of the object may be found by determining the amount that said carrier waves are out of phase when they arrive at said antennas.

In another embodiment of the invention the antennas are rotatably mounted so that they may be moved into a position where the reflected radio pulses arrive at the antennas in phase. With this arrangement the phase shifter may be omitted.

The invention will be better understood from the following description taken in connection with the accompanying drawing in which Figure 1 is a block diagram of a radio locator system designed according to one embodiment of the invention, and Figure 2 is a perspective view of an antenna arrangement that may be employed in a second embodiment of the invention.

Figure 1 shows a pair of spaced receiving antennas 10 and 11 which are connected to a phase comparison circuit described hereinafter, and a transmitting antenna 12 which is connected to a radio pulse transmitter for radiating pulses toward the aircraft or other object to be located. The particular antennas illustrated are dipoles that are provided with parabolic reflectors.

The antenna 12 has radio pulses supplied to it from a conventional pulse modulated transmitter comprising a radio frequency oscillator 13, a pulse modulating circuit 14, and a pulse generator 17 which supplies electrical pulses 16 to the modulating circuit 14. In addition to the use of the reflected radio pulses for direction finding as described hereinafter, they preferably are also used in accordance with well known radar technique for determining the distance to the reflecting object.

The receiving portion of the distance determining system comprises a receiving antenna 18, a radio receiver 19, a cathode-ray indicator tube 21, and a sawtooth wave generator 22. The sawtooth wave generator 22 is synchronized with the pulse transmission by a connection 23 to the pulse generator 17. The sawtooth wave is applied to a pair of deflecting plates 24 in the tube 21 for deflecting the cathode ray horizontally along a distance scale. The received pulses are applied from the receiver 19 to a pair of vertical deflecting plates 26 in the tube 21 whereby a "pip" on the cathode-ray trace indicates the presence of an aircraft or other object at a certain distance from the radar system.

Referring more specifically to the direction finding portion of the radio locator system, if the pulses radiated from the antenna 12 are reflected from an approaching aircraft, for example, they are picked up by the spaced antennas 10 and 11 and supplied over transmission lines 31 and 32, respectively, to a pair of superheterodyne receivers 33 and 34, respectively. The receivers 33 and 34 have a common local oscillator 36, the output of which beats with the radio frequency pulses arriving at antennas 10 and 11 to produce corresponding intermediate-frequency pulses at the receiver output conductors 37 and 38, respectively. The I.-F. carrier frequency of the pulses on conductor 37 and the I.-F. carrier frequency of the pulses on the conductor 38 will have a phase relation that is a function of the location of the approaching aircraft with respect to the antennas 10 and 11.

If, for example, the aircraft is equally distant from the antennas 10 and 11, and if the system is symmetrical so that it introduces the same phase shift between the antenna 10 and the conductor 37 as between the antenna 11 and the conductor 38, then the I.-F. carrier waves of the pulses on conductors 37 and 38 will be in phase. An indication of this "in phase" condition gives the information that the aircraft is on a line that is normal to the axis of the antennas 10 and 11 (i.e., normal to a line drawn between antennas 10 and 11) and that intersects said axis at a point midway between the two antennas.

The phase relation of the I.-F. carrier waves of the pulses on conductors 37 and 38 may be shown by applying said pulses to the vertical deflecting plates 41 and to the horizontal deflecting plates 42, respectively, of a cathode-ray tube 43. If these pulses are applied from the receivers 33 and 34 to the deflecting plates 41 and 42 of the tube 43 without additional phase shift, the resulting Lissajous figure on the cathode-ray tube screen will be a straight line in the above-mentioned example.

In the embodiment of the invention shown in Fig. 1, either the signal carried by the conductor 37 or that carried by the conductor 38 (by the conductor 37 in the example shown) is applied to one pair of the deflecting plates through a phase shifter 44 which may be of the goniometer type having an adjusting knob 40. In the above-mentioned example where the aircraft is equidistant from the antennas 10 and 11, the straight line Lissajous figure is obtained when the phase shifter 44 is set for zero phase shift, and this zero setting indicates that the aircraft is in the direction above stated.

From the foregoing it will be evident that the phase shifter 44 may be calibrated so that it gives the direction of the aircraft or other pulse reflecting object directly on a scale 45 after the phase shifter has been adjusted to make the Lissajous figure on the tube 43 a straight line.

In order to avoid an undesired and confusing Lissajous figure due to the reception at the antennas 10 and 11 of directly transmitted pulses, it is desirable to block the cathode ray of the tube 43 during the instant of pulse transmission. This may be done by applying pulses of negative polarity from the pulse generator 17 over a conductor 46 to the control grid 47 of the cathode-ray tube 43.

For accuracy in determining direction, the antennas 10 and 11 should be spaced several wavelengths apart. A spacing of seven wavelengths, for example, is satisfactory. It will be evident, however, that with such antenna spacing there is a plurality of directions from which the reflected pulses arrive at the antennas 10 and 11 with their carrier waves in phase. Since this results in an ambiguity in the direction indication, a third direction finding antenna 51 is provided which is in line with the antennas 10 and 11, and spaced less than one wavelength from the antenna 10.

A switch 52 is provided so that either the antenna 51 or the antenna 11 may be connected to the receiver 34. The transmission line 53 connecting the antenna 51 to the receiver 34 is of the same length as the transmission lines 31 and 32.

In operation, the antenna 51 is connected to the receiver 34 and a bearing reading is obtained after adjusting the phase shifter 44 until the straight line Lissajous figure is obtained as previously described. Then to get a more accurate reading, the antenna 11 is switched in (replacing the antenna 51). This usually results in the Lissajous figure no longer being a straight line. The phase shifter 44 is then further adjusted until the Lissajous figure is again a straight line. The more exact bearing may now be read off the direction indicator scale 45.

Figure 2 illustrates an antenna arrangement that may be used in an embodiment of the invention wherein the phase shifter 44 either is omitted or is set at some predetermined phase shift position, and wherein the "in phase" relation at the cathode-ray tube 43 is obtained by changing the positions of the spaced antennas. Two pairs of spaced antennas 61 and 62, and 63 and 64 are mounted on a gimbal structure 66 so that they may be turned through the required angles in the horizontal plane and the vertical plane, respectively, to point them toward an aircraft or other target for obtaining the "in phase" condition of reception.

The azimuth bearing of the target is indicated at the dial 67 after the antennas 61 and 62 have been turned about the vertical axis shaft 68 to the "in phase" position. The elevation angle of the target is indicated at the dial 69 after the antennas 63 and 64 have been turned about the horizontal shaft 71 to the "in phase" position by means of a crank 72 and gearing 73 and 74.

For the purpose previously described, the antennas 61 and 63 preferably have antennas 76 and 77, respectively, spaced less than one wavelength from them. The antennas shown in Fig. 2 may be of any suitable type such as dipoles provided with parabolic reflectors, as illustrated, or horn antennas. The azimuth determining antennas 61, 76 and 62 and the elevation determining antennas 63, 77 and 64 preferably supply signals to two separate direction finding circuits such as shown in Fig. 1, whereby two or more operators may obtain azimuth and elevation readings simultaneously. As in the system of Fig. 1, the transmission lines (not shown) between the three antennas and the two radio receivers preferably are of the same length. It will be apparent that in in the embodiments of both Fig. 1 and Fig. 2 the target direction is found by bringing the carrier wave signals received at the spaced points into the "in phase" or other predetermined phase relation at the phase indicator tube 43.

I claim as my invention:

1. A system for determining the direction in which a radio wave reflecting object is located which comprises means for transmitting carrier wave energy toward said object, means comprising three spaced antennas for receiving the energy reflected back by said object either at two points spaced a plurality of wave lengths apart or at two points spaced less than one wave length apart as desired, means including a phase indicator for comparing the phase of the carrier wave received at one of said two points with the phase of the carrier wave received at the other of said two points, means for adjusting the phase of the carrier wave of the signal received at one of said two points with respect to the carrier wave of the signal received at the other of said two points to bring said carrier waves into a predetermined phase relation at said phase indicator, and means for indicating direction as a function of said phase shift adjustment.

2. A system for determining the direction in which a radio wave reflecting object is located which comprises means for transmitting pulses of radio energy toward said object, means for receiving at two spaced points the pulses reflected back by said object, means including a cathode-ray tube phase indicator for comparing the phase of the carrier wave of the pulses received at one of said points with the phase of the carrier wave of the pulses received at the other of said points, said cathode-ray tube having two deflecting means angularly displaced with respect to each other and having the pulses of carrier wave received at one of said points applied to one of said deflecting means and having the pulses of carrier wave received at the other of said points applied to the other of said deflecting means, means for blocking the cathode ray of said tube during the instant of radio pulse transmission, means for adjusting the phase of the carrier wave of the signal received at one of said points with respect to the carrier wave of the signal received at the other of said points to bring said carrier waves into a predetermined phase relation at said phase indicator, and means for indicating direction as a function of said phase shift adjustment.

DE WITT R. GODDARD.

REFERENCES CITED

The following references are of record in the file of this patent:

UNITED STATES PATENTS

| Number | Name | Date |
|---|---|---|
| 984,108 | Roos | Feb. 14, 1911 |
| 2,116,717 | Scharlau | May 10, 1938 |
| 2,416,155 | Chubb | Feb. 18, 1947 |
| 2,440,250 | Deloraine | Apr. 27, 1948 |
| 2,470,787 | Nosker | May 24, 1949 |

FOREIGN PATENTS

| Number | Country | Date |
|---|---|---|
| 526,658 | Great Britain | Sept. 23, 1940 |
| 553,618 | Great Britain | May 28, 1943 |

OTHER REFERENCES

"Proceedings of the Institute of Radio Engineers," vol. 16, No. 5, May 1928, pp. 658 to 665.